Patented Feb. 16, 1943

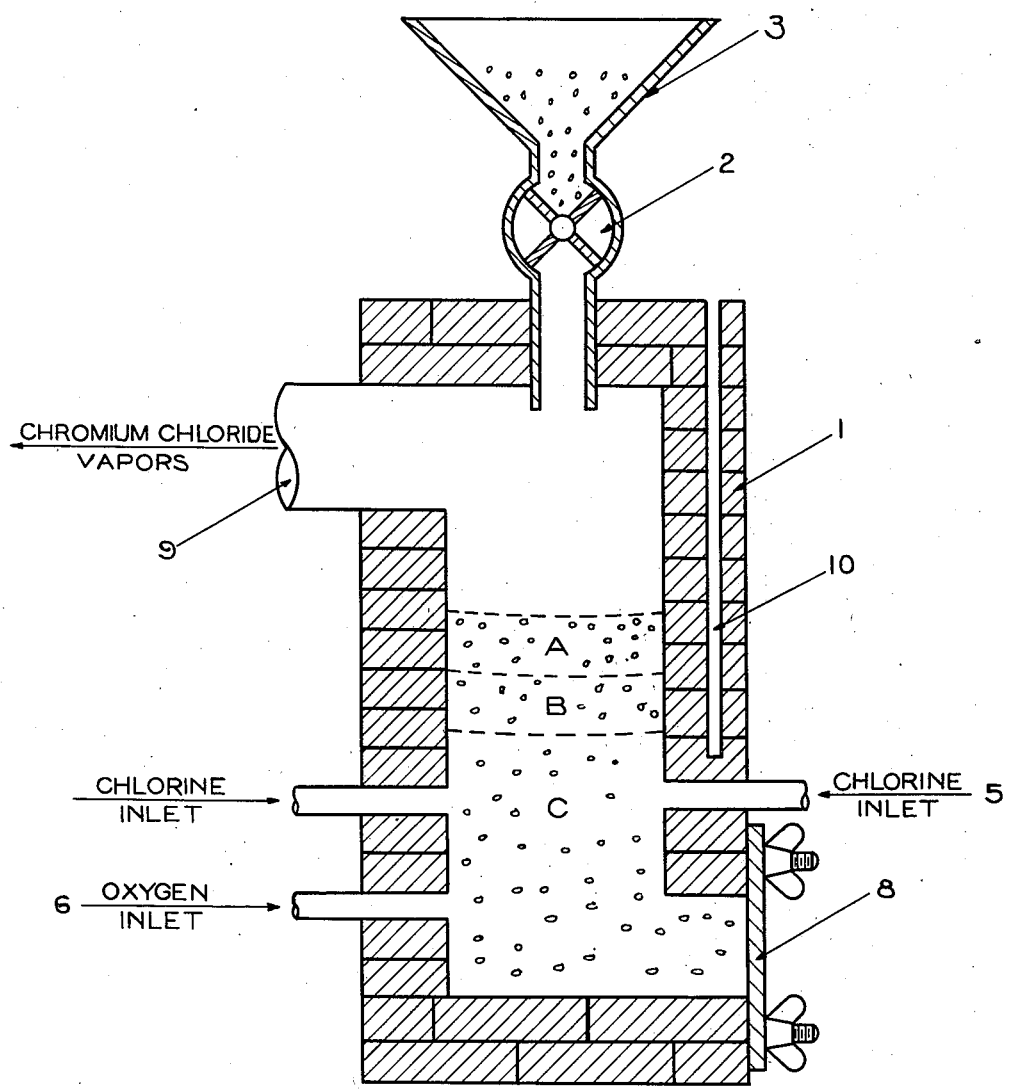

2,311,458

UNITED STATES PATENT OFFICE 2,311,458

CHLORINATION OF CHROMIUM BEARING MATERIALS

Irving E. Muskat, Akron, Ohio, assignor to Pittsburgh Plate Glass Company, Allegheny County, Pa., a corporation of Pennsylvania Application February 8, 1941, Serial No. 378,083

12 Claims. (Cl. 75—112)

This invention relates to a method of chlorinating chromium bearing materials and is particularly related to the chlorination of chromite ore or other chromium oxide bearing substances. It is known to chlorinate such materials in a shaft furnace wherein ore to be treated is introduced into the upper portion of the furnace upon a bed of ore, chlorine introduced into the lower portion of the furnace and chromic chloride or chromium tetrachloride is formed, vaporized, and withdrawn from the furnace. In the operation of this process, it is often observed that an excessive quantity of chlorine is required in order to secure substantially complete chlorination of the chromium constituents in the ore. In such a case, the volume of chlorine and other gases passing through the ore bed may be so great that the rapid passage of the gases through the bed often results in the formation of channels or "blow holes" through which the gases pass without contacting the ore to a substantial degree. Additionally, it has been observed that maintenance of uniform temperature and operating conditions is difficult in such a process.

In accordance with the present invention, I have found that operation may be substantially improved and the chlorine utilization substantially increased by maintaining a portion of the reaction zone having a depth of at least about six inches and preferably not less than about 12 inches at a temperature above 950° C., and preferably not less than 1150° C. To insure efficient operation the furnace is generally operated to maintain this zone or at least the hottest portion thereof a substantial distance, generally at least about 6 to 8 inches or more below the surface of the ore bed. By this means, vaporized halides are withdrawn from the hottest portion of the hot zone and thereafter contact the untreated material in the upper portion of the bed, thereby assisting in raising the temperature of this material to the reaction temperature. At the same time, a major portion of unutilized chlorine escaping from the hot zone is absorbed during passage through this upper layer of ore. As a further means for promoting chlorine utilization, when treating chromite ore or other chromium oxide bearing materials, it is found desirable to conduit the reaction in the presence of a substantial quantity of carbon. In treating an ore containing 29 percent chromium and 15 percent iron at least 30 percent and preferably above 40 percent of a suitable reducing agent, such as carbon, peat, petroleum coke, etc., based upon the weight of the ore undergoing treatment is used. Generally, the carbon concentration should be at least twice the amount theoretically required for reduction of the metallic oxides in the ore to the metallic state and oxidation of the carbon to carbon dioxide.

While the present process may be conducted in an externally heated furnace, applicant has found that this is not essential since it has been discovered that if the reaction is conducted at a temperature of 850° C. or above, the heat evolved during the reaction is sufficient to maintain the reaction in continuous operation without externally heating the reactor. This process has been described and claimed in my United States Patent No. 2,240,345.

The accompanying drawing which is a diagrammatic sectional view of a furnace which may be used in accordance with the present invention will assist in a more complete understanding thereof. The apparatus comprises a suitable shaft furnace 1, constructed of firebrick or other resistant material and is provided with chlorine tuyères 5, oxygen or inert gas tuyères 6, and a discharge 9 for the chloride vapors. A suitable storage hopper 3, equipped with a star feeder 2, is mounted upon the top of the furnace. The furnace is also provided with suitable means, such as a door 8, located in a lower portion thereof, for withdrawing unchlorinated residue.

In the normal operation of this device, a carbonaceous material may be burned within the furnace or other means may be used to preheat the furnace to a suitable temperature, for example 950° C. or above. Thereafter, a mixture of ore and a suitable carbonaceous material such as coke, coal, charcoal, carbon monoxide, etc., are introduced and chlorine is introduced through the tuyères to initiate the reaction. The process may be conducted in a continuous manner by continuing the introduction of ore, chlorine and carbon at a rate sufficient to maintain the temperature of the reaction above about 950° C., and preferably above 1150° C. Ore is introduced with sufficient rapidity to maintain an ore bed of substantial depth, generally not less than about 12 to 18 inches deep, measured from the point of introduction of chlorine to the top of the ore bed. The depth of the bed also may be regulated by controlling the rate of withdrawal of unchlorinated residue in accordance with the observation of the depth of the bed which may be determined by periodically observing the level of the ore in the furnace.

In order to secure effective chlorine utilization and to improve the general efficiency of the operation, it is found desirable to maintain a zone of at least about 6 inches in depth at a temperature above 950° C., preferably about 1150° C. This zone may be maintained by regulating the rate of ore introduction in accordance with periodic observation of the temperature throughout the ore bed and observation of the level and total thickness of the entire bed, measured from the point of introduction of chlorine to the top of the bed where the chloride vapors are removed. Thus, by initial establishment of a bed of ore of substantial thickness, generally in excess of one foot and preferably above 18 inches in depth, and by maintaining the level of the bed substantially constant by periodic or continuous additions of ore and withdrawal of ash and unchlorinated ore, it is possible to maintain a hot zone at the required temperature and depth.

In the operation it is often observed that the zone of highest temperature or "hot zone" tends to concentrate at the top of the ore bed. This is found to be objectionable since in such a case chlorine utilization is often incomplete and a substantial quantity of ore remains unchlorinated during passage through the furnace. It has been found that these difficulties may be avoided to a substantial degree by maintaining the hot zone below the top of the ore bed. This may be accomplished by regulation of the rate of ore and chlorine introduction. For example, if it is desired to lower the level of the hot zone, an additional quantity of ore may be introduced upon the top of the bed and thereafter, ore is introduced at a regular rate sufficient to maintain the "hot zone" at the desired level.

It has been found that if a substantial excess of chlorine, in excess of that required for complete chlorination of the chloridizable constituents is introduced into the ore bed, the hot zone tends to establish itself adjacent the top of the bed. In accordance with the present invention, applicant has found that by use of substantially less chlorine, the hot zone may be lowered to a point substantially below the top of the ore bed. Thus, the location of the hot zone may be regulated to a considerable degree by adjustment of the ore and chlorine introduction rates in accordance with observations of the temperature variation throughout the bed as determined by means of thermocouple well 10, or by other means.

Ore may be chlorinated in a coarse or finely ground state or in the form of briquettes or other suitable form, mixed with the required amount of carbonaceous material such as charcoal, coke, or the like. If desired, the ore may be ground to minus 100 mesh or finer, and intimately intermixed with finely divided carbon such as peat, petroleum, or coal coke, charcoal, etc., the degree of intermixing being that required to obtain a composition which is approximately homogeneous.

It will thus be noted that as illustrated in the drawing, a plurality of zones of chlorination are established. Ore, as it is introduced into the furnace, is deposited upon the top of the ore bed in section designated "A" in the drawing. At this point it is contacted with hot escaping gases containing vaporized chlorides and which may also contain more or less unreacted chlorine, whereby reaction is initiated. If cold ore has been introduced or if the ore has been preheated externally or internally to a temperature below the temperature of the reaction, substantial preheating occurs in this zone. In most cases, depth of this zone is preferably at least 4 to 6 inches.

Thereafter, the ore settles into the hottest portion of the reaction denoted as "B" in the drawing, where the major portion of the reaction occurs. As previously stated, this bed should preferably be maintained at least 6 inches deep and the temperature therein should be in excess of about 950° C., preferably above 1150° C. The depth of this bed may be maintained by regulation of the rate of ore and chlorine introduction and the temperature of preheating, if the ore is preheated. Thus, where large excesses of chlorine are utilized, the portion "B" may become undesirably thin. This may be overcome by increasing the rate of ore introduction, by decreasing the rate of chlorine introduction, or both.

Generally the process is conducted in a manner such that the vapors after condensation of the chromium and iron chlorides do not contain in excess of about 3 percent chlorine. Unchlorinated residue settles into zone "C" where it is contacted with substantially pure chlorine introduced at the base of the ore bed. At this point the pure chlorine tends to chloridize unchlorinated ore and thereby to insure more complete removal of chromium therefrom. Moreover, the incoming chlorine is preheated whereby reaction is initiated more rapidly.

In order to further promote rapidity of reaction and an efficient utilization of chlorine, it is generally desirable that the total depth of bed measured from the top of the bed to the point of chlorination zone be not less than 18 inches. By the utilization of a bed of such depth incoming chlorine contacts the hot unchlorinated residue in the zone designated "C" and is preheated to reaction temperature whereby a more rapid initiation of the chlorination is effected.

In the operation of a deep ore bed wherein the hot zone is maintained a distance below the surface of the bed care must be taken to avoid plugging of the upper portion of the bed. Thus, it is found that unless the temperature of the ore adjacent the surface of the bed in the zone designated "A" is maintained above about 850° C., plugging may occur. The temperature of this portion of the bed may be maintained by regulation of the rate of introduction of ore and by use of preheated ore, if necessary to prevent excessive cooling of the upper portion of the bed.

The process is preferably conducted in the presence of air or oxygen or other agent capable of minimizing sintering as described in my copending application Serial No. 310,537, filed December 22, 1939, and United States Letters Patent No. 2,185,218, granted to myself and Norman Howard, in order to prevent or substantially minimize bridging or sintering within the ore bed. In such a case it is desirable to utilize at least ½ to 5 volumes of air or 0.1 to 3 volumes of oxygen or other agent for prevention of sintering, per volume of chlorine. Likewise, the reaction may be conducted in the presence of various gaseous reducing agents, such as carbon monoxide, natural gas, carbon tetrachloride, hydrogen, sulphur vapor, phosgene, etc. In any event, however, the amount of chlorine introduced should not be less than about 15 percent by volume of the total gases introduced since in such a case difficulty may be encountered in securing effective chlorination of the material undergoing treatment.

The following example is illustrative:

A quantity of briquettes ¼ to ¾ inch in diameter were prepared from a mixture of 100 parts by weight of chromite ore containing 29.2 percent chromium, 14.7 parts iron, 7.2 percent magnesium, and 6.4 percent aluminum; 35 parts by weight of carbon and 14 parts by weight of molasses by baking at 600° C. until the volatile hydrocarbons were substantially removed. The carbon content of the briquettes was about 25 percent of the weight of the fired briquettes.

A shaft furnace having an internal diameter of 16 inches was preheated by a coke fire within the shaft to 1000° C. A charge of 125 pounds of briquettes and 20 pounds of coke was introduced and an air blast maintained for 5 minutes through the shaft to insure ignition of the added coke. At this time, 50 pounds of briquettes were added and chlorine introduced into the shaft to initiate the reaction. Chlorine was introduced at a rate of 125 pounds per hour, air at 1000–1200 cubic feet per hour, while briquettes were added at the rate of 125 pounds per hour, and the depth of the ore bed maintained at 6 feet, measured from the point of chlorine introduction to the top of the bed. For a period of over 24 hours the temperature of a portion of the reaction bed approximately 6 inches deep was maintained at 950° C. to 1100° C. The hottest portion of the reaction zone was maintained above about 1250° C. The locus of the hot portion of the reaction zone remained at a point about 10 inches below the top of the bed. Over 98 percent of the chlorine introduced was utilized. In similar tests, when the reaction zone was maintained at the top of the bed it was found that chlorine utilization seldom exceeded 80 percent.

Hydrogen chloride, phosgene, carbon tetrachloride or other gaseous chlorinating agent may be used in conjunction with or in lieu of chlorine in accordance with my invention.

Although the present invention has been described with reference to specific details of certain embodiments thereof, it is not intended that such details shall be regarded as limitations upon the scope of the invention, except insofar as included in the accompanying claims.

I claim:

1. A method of chlorinating a chromium bearing material which comprises forming a bed of said material, maintaining the temperature within at least a portion of said bed sufficiently high to cause vaporization of a chloride of chromium, introducing a chlorination agent into a lower portion of said bed and withdrawing a vaporized chloride of chromium from an upper portion thereof, regulating the rate of introduction of chlorine to maintain the hottest portion of the ore bed at least about 6 inches below the point at which the said vaporized chloride is withdrawn and regulating the rate of introduction of chlorine and chromium bearing material such that sufficient heat is evolved to maintain a temperature within the bed above 900° C. without externally heating the reactor in which the bed is undergoing chlorination.

2. A method of chlorinating a chromium bearing ore which comprises forming a bed of said ore and a reducing agent, maintaining the temperature within at least a portion of said bed sufficiently high to cause vaporization of a chloride of chromium, introducing a chlorination agent into a lower portion of said bed, withdrawing a vaporized chloride of chromium from an upper portion thereof and regulating the rate of introduction of chlorine to maintain the hottest portion of the ore bed at least about 6 inches below the point at which the said vaporized chloride is withdrawn regulating the rate of introduction of chlorine and chromium bearing ore such that sufficient heat is evolved to maintain a temperature within the bed above 900° C. without externally heating the reactor in which the bed is undergoing chlorination.

3. A method of chlorinating a chromium bearing material containing at least about 10 percent of chromium which comprises forming a bed which contains said material, passing chlorine through said bed, maintaining the temperature above about 900° C., withdrawing vaporized halides from the upper surface of the bed, introducing chromium bearing material into the bed and regulating the rates of introduction of said material and of chlorine to maintain a portion of the bed at least about 6 inches in thickness at a temperature above about 950° C. without externally heating the reaction chamber in which said bed is undergoing chlorination.

4. A method of chlorinating a chromium ore containing at least about 10 percent of chromium which comprises forming a bed which contains said material, passing chlorine through the said bed, maintaining the temperature above about 900° C., withdrawing vaporized halides from the upper surface of the bed, introducing chromium ore into the bed and regulating the rate of introduction of chlorine and said material to maintain the temperature of a portion of the bed at least about 6 inches in thickness above about 950° C. without externally heating the reaction chamber.

5. A method of chlorinating a chromium ore containing at least about 10 percent of chromium which comprises forming a bed which contains said material, passing chlorine through said bed, maintaining the temperature above about 1150° C., withdrawing vaporized halides from the upper surface of the bed, introducing chromium ore into the bed and regulating the rate of introduction of chlorine and said material to maintain the temperature of a portion of the bed at least about 6 inches in thickness above about 1150° C. without externally heating the reaction chamber.

6. The method of chlorination which comprises chlorinating a bed which contains primarily chromium ore and a reducing agent to form a vaporized chloride of chromium, introducing further portions of ore into said bed at a rate sufficient to maintain the depth of said bed measured from the point of chlorine introduction to the point at which vapors are withdrawn from the bed at least 12 inches deep and correlating the rate of addition of ore, chlorine and reducing agent to establish and maintain a zone at least about 6 inches deep at a temperature above about 950° C. without externally heating the reaction chamber in which said bed is undergoing chlorination.

7. The method of chlorination which comprises chlorinating a bed of chromium ore and a reducing agent to form a vaporized chloride of chromium, introducing further portions of ore into said bed at a rate sufficient to maintain the depth of the said bed measured from the point of chlorine introduction to the point at which vapors are withdrawn from the bed at least 12 inches deep and correlating the rate of addition of ore, chlorine and reducing agent to establish and maintain a zone at least about 6 inches deep at a temperature above about 950° C. and to maintain the zone of highest temperature within the bed at least about 6 inches from the point at which the vaporized chloride is withdrawn without externally heating the reaction chamber in which said bed is undergoing chlorination.

8. The method of chlorination which comprises chlorinating a bed of chromium ore and a reducing agent to form a vaporized chloride of chromium, introducing further portions of ore into said bed at a rate sufficient to maintain the depth of said bed measured from the point of chlorine introduction to the point at which vapors are withdrawn from the bed at least 18 inches deep and correlating the rate of addition of ore, chlorine, and reducing agent to establish and maintain a zone at least about 6 inches wide at a temperature above about 950° C. and to maintain the zone of highest temperature within the bed at least about 6 inches from the point at which the vaporized chloride is withdrawn without externally heating the reaction chamber in which said bed is undergoing chlorination.

9. The method of chlorination which comprises chlorinating a bed of chromium ore and a reducing agent to form a vaporized chloride of chromium, introducing further portions of ore into said bed at a rate sufficient to maintain the depth of said bed measured from the point of chlorine introduction to the point at which vapors are withdrawn from the bed at least 12 inches deep and correlating the rate of addition of ore, chlorine, and reducing agent to establish and maintain a zone at least about 6 inches deep at a temperature above about 950° C. and to maintain the zone of highest temperature within the bed at least about 6 inches from the point at which the vaporized chloride is withdrawn and maintaining the temperature of the ore adjacent the portion of the bed where the vapors are withdrawn above 800° C. without externally heating the reaction chamber in which said bed is undergoing chlorination.

10. A method of chlorination which comprises forming a bed comprising briquettes of a chromium bearing material and a carbonaceous reducing agent, introducing chlorine into said bed, introducing oxygen in amount sufficient to minimize sintering within the bed, adding further portions of briquettes thereto, maintaining the temperature sufficient to insure vaporization of chromium chloride, withdrawing said chloride, and regulating the rate of addition of chlorine and briquettes to maintain the hottest portion of the bed at least about 6 inches below the point at which the vaporized chloride is withdrawn.

11. A method of chlorination which comprises forming a bed comprising briquettes of a chromium bearing material and a carbonaceous reducing agent, introducing chlorine into said bed, introducing oxygen in amount sufficient to minimize sintering within the bed, adding further portions of briquettes thereto, maintaining the temperature sufficient to insure vaporization of chromium chloride, withdrawing said chloride and regulating the rate of addition of chlorine and briquettes to establish and maintain a portion of the bed at least about 6 inches in thickness above about 950° C. without externally heating the reaction chamber in which said bed is undergoing chlorination.

12. The process of claim 2 in which the ore introduced is preheated.

IRVING E. MUSKAT.